United States Patent [19]
Rivir et al.

[11] Patent Number: 5,963,292
[45] Date of Patent: Oct. 5, 1999

[54] THERMAL TUFT FLUID FLOW INVESTIGATION APPARATUS WITH A COLOR ALTERABLE THERMALLY RESPONSIVE LIQUID CRYSTAL LAYER

[75] Inventors: Richard B. Rivir, Kettering, Ohio; James W. Baughn, Davis; Jessica L. Townsend, San Diego, both of Calif.; Robert J. Butler, Colorado Springs, Colo.; Aaron R. Byerley, Macon, Ga.

[73] Assignee: The United States of America as represented by the Secretary of the Air Force, Wright-Patterson Air Force Base, Ohio

[21] Appl. No.: 08/976,134

[22] Filed: Sep. 29, 1997

Related U.S. Application Data
[60] Provisional application No. 60/029,385, Oct. 29, 1996.

[51] Int. Cl.$^6$ ............................... G02F 1/13; G01M 9/00
[52] U.S. Cl. .............................................. 349/199; 73/147
[58] Field of Search ................................ 349/199; 73/147

[56] References Cited

U.S. PATENT DOCUMENTS

| | | | |
|---|---|---|---|
| 3,809,480 | 5/1974 | Somerville et al. | 356/103 |
| 3,835,703 | 9/1974 | Bush | 73/147 |
| 3,977,244 | 8/1976 | Stone | 73/147 |
| 4,255,048 | 3/1981 | Franke | 356/28.5 |
| 4,807,990 | 2/1989 | Keefer | 356/28.5 |
| 4,896,532 | 1/1990 | Schmalz | 73/147 |
| 5,045,699 | 9/1991 | Schulze et al. | 250/330 |

OTHER PUBLICATIONS

Jessica L. Townsend, "A Laser thermal Tuft Using Liquid Crystals for Flow Visualization", Thesis submitted to Univ. of Calif. at Davis, 1996.

*Primary Examiner*—William L. Sikes
*Assistant Examiner*—Heidi L. Eisenhut
*Attorney, Agent, or Firm*—Gina S. Tollefson; Gerald B. Hollins; Thomas L. Kundert

[57] ABSTRACT

A heat transfer-based surface flow visualization method and device that uses a temperature sensitive material to detect advection along a substrate upon application of heat and air flow and thereby provides a surface flow pattern. The present invention includes the capability of providing surface flow patterns for positions of flow separation, reversal of flow and transition flow and is non-intrusive and more cost effective than known methods.

12 Claims, 3 Drawing Sheets

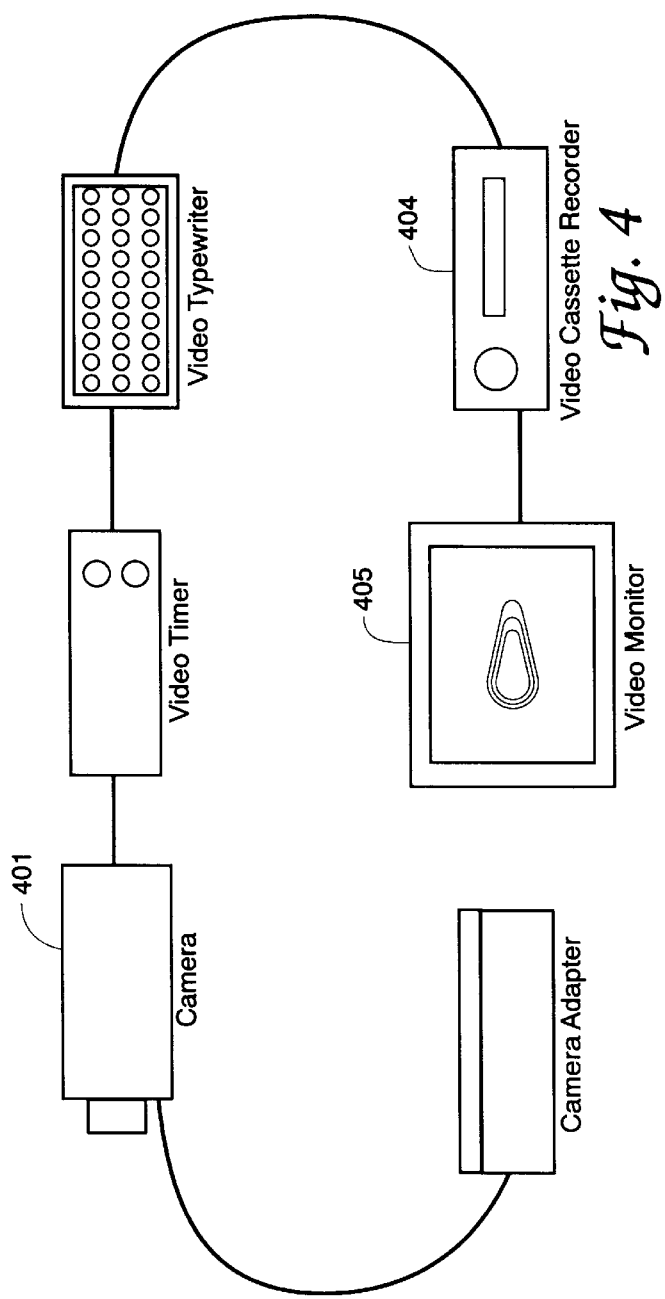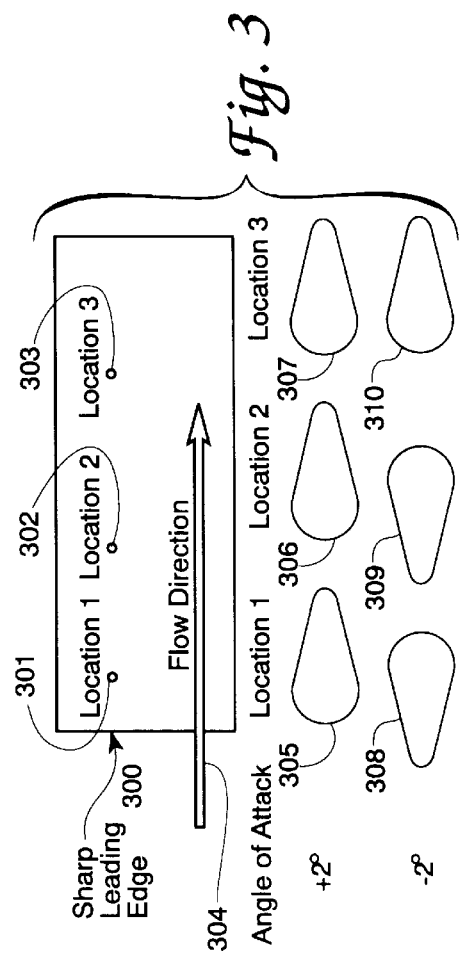

THERMAL TUFT FLUID FLOW INVESTIGATION APPARATUS WITH A COLOR ALTERABLE THERMALLY RESPONSIVE LIQUID CRYSTAL LAYER

This application claims the benefit of the U.S. provisional application 60/029,385 filed on Oct. 29, 1996. +gi

RIGHTS OF THE GOVERNMENT

The invention described herein may be manufactured and used by or for the Government of the United States for all governmental purposes without the payment of any royalty.

BACKGROUND OF THE INVENTION

This invention relates to the field of flow visualization and more particularly to surface flow visualization using heat responsive liquid crystal material for detecting flow separation and transition from laminar to turbulent flow.

There are many methods used today for flow visualization. The method used for a certain situation depends on the type of information desired. Some common methods for flow visualization include tufts, tracers in liquids, surface tracing methods, laser Doppler velocity, thermography, and liquid crystals.

One of the earliest techniques of flow visualization is the use of tufts on a surface. A tuft is a device attached directly to a surface that indicates the flow direction at the surface. The main problem with tufts is that they can disturb the flow characteristics that they are trying to measure. Applying tufts to a model for visualization purposes can increase the drag about the model. Also, tufts have a tendency to exhibit some instabilities, in the form of the end of the tuft whipping around.

Another method for flow visualization is the surface tracing method where visualization is provided by means of a coating on the surface of a body in a flow. The fluid flowing around the body changes the coating, allowing flow characteristics to be determined. The three main methods of surface tracing are chemical, where a reaction between the coating and the fluid occurs, physical, such as sublimation, evaporation, or dissolution, and mechanical, where the change of position or shape of small particles on the surface of the body occurs. One thing to note about surface tracing methods is that the flow visualization pattern found from these methods reflects what is happening at the surface of the model inside the boundary layer, the boundary layer being a thin layer of flow material that adheres to the surface of the body under test. Boundary layer separation occurs when this thin layer of flow material separates from the surface of such body under test and the flow in the boundary layer then becomes reversed. An advantage to surface tracing methods is that the direction of flow can be found during or immediately after the experiment. However, once a surface is coated, it can be used to find results only once and then it must be recoated following a long process of application, drying, solidifying and grinding (in the case of a chemical surface coating).

Another conventional method is laser Doppler velocity which can be employed to determine the local velocity and direction or stream line. Laser Doppler velocity is considered to be non-intrusive but does not always have adequate optical access for complex wall or body shapes and a system might cost on the order of $200K to make these determinations and require several weeks or months to obtain the experimental results.

Thermography is a method used mainly for the determination of the heat transfer coefficient, finding a temperature distribution and sometimes for flow visualization. A thermograph is an instrument used to take instantaneous infrared pictures of a surface. These pictures can be taken over a time period, allowing a continuous time history of the data to be collected and analyzed. Usually, pictures taken using a thermograph go through some form of image processing. Thermography is considered to be non-intrusive and is used mainly in studies of convective flows.

Liquid crystal methods are used to determine heat transfer coefficients and temperature distributions on a surface. Liquid crystals may be described as encapsulated molecules—a state of matter that combines the long-range order of solids with the ability of liquids to form droplets and pour. Thermochromic liquid crystals reflect light at a wavelength which is a function of crystal temperature. If a selected liquid crystal material is applied to a dark background, it will accurately reflect the surface temperature by means of a color distribution. The liquid crystal can be calibrated for a certain color, for example, yellow to reflect at a certain temperature. Liquid crystal methods are considered to be non-intrusive.

A new system for surface flow visualization using liquid crystals is disclosed herein and can be used to determine such flow characteristics as flow direction, separation, reattachment and recirculation. Further, it is non-intrusive and does not physically disturb or distort the flow being measured.

SUMMARY OF THE INVENTION

The present invention provides surface flow visualization in which temperature sensitive material is altered upon application of air flow and local heat and thereby provides a test object surface flow pattern representation. The invention includes the capability of providing surface flow patterns for positions of boundary layer flow separation, reversal of flow and transition flow, is non-intrusive and is more cost effective than known methods.

It is therefore a principal object of the invention to provide a non-intrusive, heat transfer-based surface flow visualization method and device.

It is another object of the invention to provide a flow visualization method and device capable of use with complex surface shapes.

It is another object of the invention to provide a flow visualization method and device capable of use in a three-dimensional flow field.

It is another object of the invention to provide an inexpensive surface flow visualization method and device.

It is another object of the invention to provide a surface flow visualization method and device that operates without contaminating the immediate environment or operating facility.

It is another object of the invention to provide a surface flow method and device capable of identifying boundary layer separation flow and transition flow from laminar flow to turbulent flow.

Additional objects and features of the invention will be understood from the following description and claims, and the accompanying drawings.

These and other objects of the invention are achieved by a heat transfer-based surface flow visualization method comprising the steps of:

coating an opaque substrate with a temperature sensitive material;

heating said temperature sensitive material;

conducting and conveying said heat along said substrate by applying air flow thereto; and observing a directional flow pattern within said temperature sensitive material on said substrate.

DESCRIPTION OF THE DRAWINGS

The invention will be clearly understood from the following detailed description of representative embodiments thereof read in conjunction with the accompanying drawings wherein:

FIG. 3 shows a typical surface flow pattern generated for positive and negative angles of attack in accordance with the invention.

FIG. 4 shows a possible video system arrangement for recording surface flow patterns in accordance with the invention.

DETAILED DESCRIPTION

The heat transfer-based surface flow visualization method and device of the present invention provides several practical improvements to known surface flow visualization methods and devices and includes the capability to determine positions of boundary layer flow separation, reversal of flow and transitional flow. To employ the present invention, a small spot of heat is created on a model or substrate coated with a temperature responsive liquid crystal material. Such crystals have the property of reflecting different wavelengths of light dependent on their temperature source heats up a small spot on the surface of the substrate, the liquid crystal experiences color changes and creates a multicolored "pattern." In the absence of flow, the heat source creates a circle of colors (isotherms) due to the circular area of the heat source such as a laser. If the model is exposed to flow, the heat is advected downstream along the surface (through conduction and convection) and the circle of colors pattern changes. This pattern can, in fact, be used to determine the direction and type of flow occurring.

Figure 1:
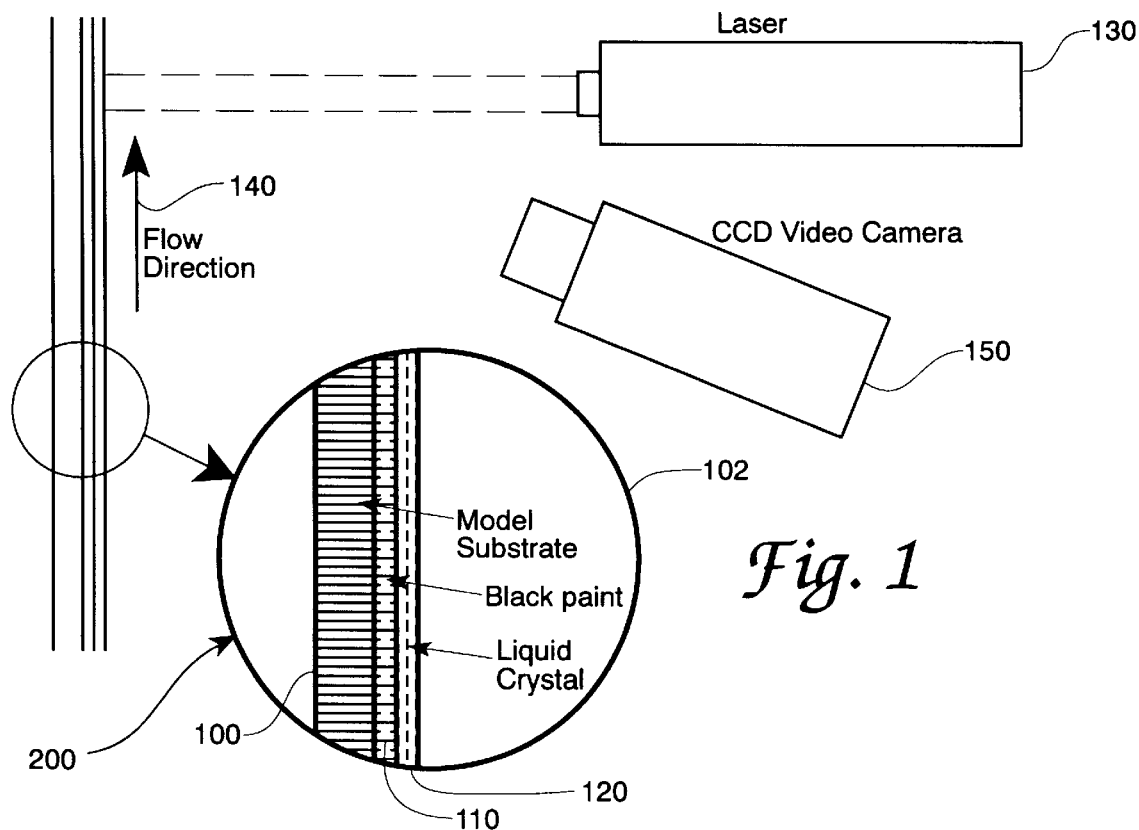
FIG. 1 illustrates components of the surface flow visualization system of the invention.

The main components of the surface flow visualization device of the present invention are shown in FIG. 1. Such components include an external heat source shown at 130, preferably a laser, a video camera at 150 for recording the surface flow path and a source of air flow represented by the arrow at 140. Generally, the source of air flow is a wind tunnel with variable air speed settings. The surface of the substrate on which a flow pattern is desired is also shown in FIG. 1 in a blown up view 102 with the substrate itself at 100, a layer of black paint at 110 and a layer of temperature sensitive material, preferably liquid crystal or phosphor, shown at 120.

Before practicing the present invention, it is desirable to first prepare the substrate shown at 100 in FIG. 1, the substrate in the testing environment representing a substitute material in the shape of an aircraft wing surface or an engine turbine blade on which knowledge of the surface directional flow path is desired. The substrate must be a poor thermal conductor for the system of the present invention to work well. both methyl acrylate plastic, commonly known as Plexiglas, and polystyrene foam, commonly known as Styrofoam, are poor conductors generally having a thermal conductivity of less than 0.4 British Thermal Units (BTUs) per hour, per square foot with a temperature gradient of one degree Fahrenheit per inch thickness. While being poor conductors both methyl acrylate plastic and polystyrene foam are good insulators. The substrate should be a poor thermal conductor to minimize the effects of heat transfer of the substrate body itself interfering with the pattern produced from the aerodynamics of air flow on the surface of the same substrate. Accordingly, if a metal wing or metal turbine blade were used for testing, the generally thermally conductive metal would produce a flow pattern reflecting both aerodynamic flow and heat transfer of the wing or blade itself. By using a non-thermally conductive substrate material for testing, the object of the test—to observe the surface flow pattern an object of this shape receives while in a flow stream—may be accomplished. The poor thermally conducting substrate surface is polished using, for example, an electric hand buffer to remove any surface scratches that might interfere with the flow of air over the surface.

After the substrate is prepared, a dark coating is applied to the substrate to obtain an opaque surface to allow optimal viewing of the temperature sensitive material and eliminate any extraneous light. The dark coating used at 110 in the arrangement of FIG. 1 is a water-based black paint applied using an air brush. Black paint is applied until the Plexiglas surface is entirely opaque, that is, until no light is visible through the paint.

After application of a dark coating to the substrate, a temperature sensitive material, preferably a liquid crystal mixture shown at 120 in FIG. 1, is applied. Two types of liquid crystals, Hallcrest R35C1W and R38C5W, are applied to the substrate in the preferred arrangement of the present invention, although many others would be suitable. The first number in the liquid crystal specification refers to the temperature where the first appearance of color occurs (red, for the these particular crystals) when the liquid crystals are being heated. The second number refers to the total band of degrees that the transition occurs through. Therefore, an R35C1W liquid crystal starts its color transition at a temperature of 35° C. (at red) and continues changing color over a band of 1° C. A liquid crystal with a bandwidth of 1° C. is often referred to as a "narrow band" liquid crystal. A liquid crystal with a bandwidth of larger than 5° C. or more is often referred to as a "broad band" liquid crystal. In practicing the method and device of the present invention, both narrow band and broad band liquid crystals may be used. A 3-to-1 mixture of water and liquid crystal material is applied to the substrate using an air brush. The liquid crystal is mixed with water so that when the mixture is applied using an air brush, the water mist acts as a carrier for the liquid crystal capsules. Several layers of the liquid crystal material are applied with an airbrush and the water is then evaporated from the mixture using a heat gun leaving only the liquid crystal microcapsules on the substrate. The thickness of the liquid crystal application may be visually inspected after the evaporation step. To a point, the more liquid crystal applied results in more brilliant colors appearing when heated with a heat source.

After the substrate is prepared in the manner described above, it is then mounted in a wind tunnel, or other facility providing controlled air flow, using known mounting techniques for testbodies in such facilities. In the arrangement of FIG. 1, the laser is mounted just outside the wall of the wind tunnel (not shown) and lined up with the location on the mounted substrate which is being tested for a surface flow pattern. The laser 130 in the preferred arrangement of the present invention of FIG. 1 is a diode pumped YAG laser manufactured by ADLAS. It is classified by the United States National Center for Device and Radiological Health as a Class IIIB laser product. It emits visible and invisible laser radiation of 0.52–0.53 μm. The air flow 140 is directed toward the substrate as shown in FIG. 1 and the laser 130 then heats a location on the substrate, the heat from the laser radiates to the liquid crystal coated substrate. Finally, convection occurs as the locally heated temperature sensitive surface, the liquid crystal coated surface, relaxes toward its heat state.

Figure 2:
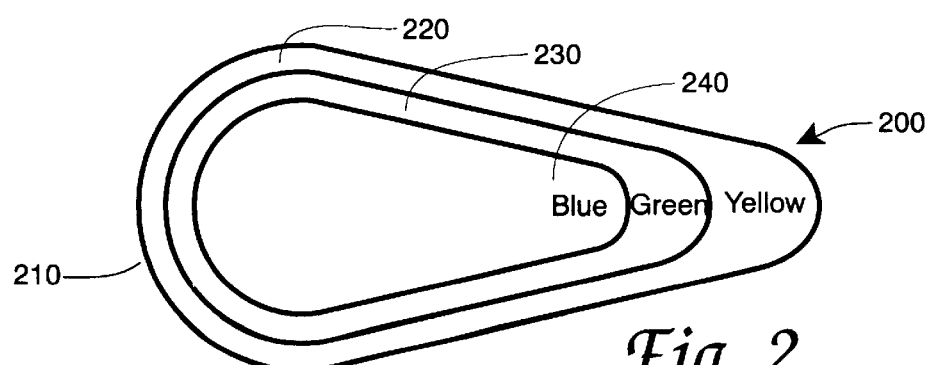
FIG. 2 shows a typical surface flow pattern generated in accordance with the invention.

FIG. 2 shows a typical surface flow pattern around the heated spot of a liquid crystal coating on a substrate having a neutral angle-of-attack exposed to air flow. That is, a substrate in the same horizontal plane as the air flow stream. A single type crystal coating may be used, but the flow pattern is most evident when the coating consists of multiple crystal types. With multiple crystal types, the pattern produces concentric circles when air does not flow and tear drop shaped patterns which clearly show the flow direction after flow is applied. The pattern includes a tail, which provides information on the flow transition of the boundary layer.

Figure 5:
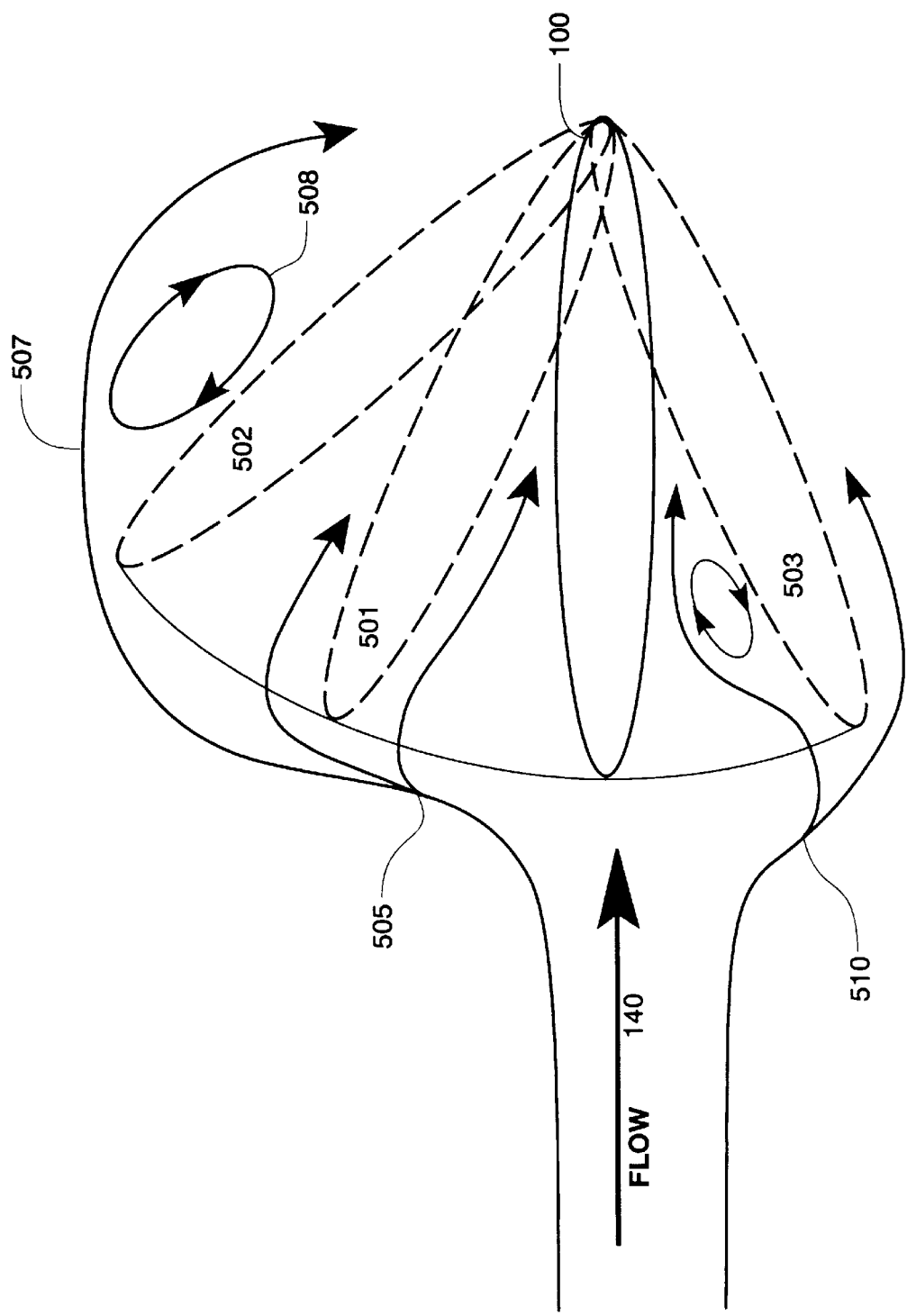
FIG. 5 shows boundary layer movement with varying angles of attack for a given substrate.

FIG. 5 illustrates how the tail of the tear drop pattern indicates the direction and condition of boundary layer flow. In FIG. 5 the substrate 100, is shown at varying angles, the substrate at 501 and 502 is shown at positive angles of attack, with the substrate position 501 showing a small positive angle-of-attack and the substrate position 502 at a larger angle-of-attack. The air flow streams traveling over the substrate set at positive angles of attack is shown at 505 and 507. Flow stream 505 shows a boundary layer still adhering to the substrate 501. A flow pattern associated with such a flow stream has the tail of the tear drop pattern in the same direction as the flow stream 140. However, the flow stream 507 associated with the substrate 502 at a larger angle of attack results in a separated boundary layer—the flow stream no longer adheres to the surface of the substrate and a backward flow direction, illustrated at 508, is produced on the surface—the tail of the associated tear drop pattern would therefore be in the opposite direction of the flowstream 140. Similarly, at a negative angle-of-attack, the substrate, illustrated at 503, has an associated air flow stream at 510 with an adhering boundary layer.

FIG. 2 illustrates a tear drop pattern with three layers of crystals, blue at 240, green at 230 and yellow at 220, and is useful in illustrating laminar flow. The tip of the teardrop, 200, or the downstream part, is relatively sharp and there are clear boundaries between the blue, green and red colors of the liquid crystals. Clear boundaries, as those shown in FIG. 2, generally indicate laminar flow since laminar flow has less lateral mixing. In contrast, a flow pattern with fuzzy or undefined boundaries at the tear drop tip between liquid crystal layers generally indicates turbulent flow, mixing and unsteadiness in the flow.

FIG. 3 illustrates typical surface flow patterns at positive and negative angles of attack for three different locations on the same substrate as that used in FIG. 2. The flow direction, represented at 304, is from left to right directed at a sharp leading edge 300 of the substrate. The first three locations on the substrate, with the substrate at a positive 2 degree angle-of-attack, produces flow patterns indicated at 305, 306 and 307. With a positive angle-of-attack, a tear drop pattern is produced with the tip on the right side, and the tear patterns all point downstream. The flow separates from the leading edge with the substrate at a positive angle causing a flow region of separation and circulation. Some reverse flow is shown on the liquid crystal tear drop patterns (not shown) due to recirculation.

Flow at the same three locations at a negative 2 degree angle-of-attack is shown at 308, 309 and 310 in FIG. 3. A teardrop shaped surface flow pattern is again produced; however, as shown at 308 and 309, the tip of the teardrop pattern is on the left-hand side of the pattern, upstream from the general flow direction. This effect is due to the reverse flow associated with separation of the boundary layer. However, at the third location 310 surface flow direction is again in the same direction as the flow direction 304. This change in flow direction is probably due to the flow going underneath the substrate, eliminating reverse flow on the upper, coated surface of the substrate.

A possible arrangement for a video system for use in recording surface flow patterns generated by the method and device of the present invention is shown in FIG. 4. Each visualization, or run, of the present invention may be recorded using the camera 401 and a video cassette recorder 404 or frame grabber. The video camera, also shown at 150 in FIG. 1, is positioned on the outside of the wind tunnel (not shown) in close proximity to the laser shown at 130 in FIG. 1, and lined up with the location on the substrate which is to be tested. The run is viewed on a video monitor 405 in FIG. 4. A high-powered lens may be used with the camera to get close up images.

The surface flow visualization method and device disclosed herein is an improvement over known methods in several respects. First, it is non-intrusive compared to known methods in that there is no contamination of the wind tunnel such as when smoke or powdered aluminum is used. Second, it directly indicates surface flow direction. Further, there is minimal contamination of the substrate compared to known methods. The present method can be employed with complex shapes—a matrix of points can be obtained on a complex substrate simply by redirecting the laser and recording camera and collecting a series of images or by rastering the laser over the surface. The method and device is also receptive to a three-dimensional flow field and accurately indicates boundary layer flow whereas many known methods do not. For example, when the tuft technique is employed, string or yarn is fastened to the substrate; not only will the tufts alter the flow being measured by their intrusion, but only the flow direction where one has attached the tufts is indicated. If the placement of the tuft is incorrect:, a separate or reverse flow presence may be missed. Finally, the device and method of the present invention is inexpensive relative to other known methods. Wind tunnel restoration is eliminated since there is no contamination from smoke or aluminum. Complex hardware for testing and analysis such as is required when using laser Doppler velocity is not necessary for the method and device of the present invention, off the shelf hardware may be employed.

It is understood that certain modifications to the invention as described may be made, as might occur to one with skill in the field of the invention, within the scope of the appended claims. All embodiments contemplated hereunder which accomplish the objects of the invention have therefore not been shown in complete detail. Other embodiments may be developed without departing from the spirit of the invention or from the scope of the appended claims.

What is claimed is:

1. Laser based thermal tuft fluid flow investigation apparatus comprising the combination of:

a substrate member comprising a shape-similar thermally insulating model of a workpiece subjected to said fluid flow;

a porous optically opaque coating layer received on said substrate member;

a color-alterable thermally responsive coating layer received on said substrate member porous optically opaque coating layer in thermal communication with said fluid flow;

laser apparatus optically coupled with a selected fluid flow-subjected local area portion of said color alterable thermally responsive coating layer; and video electronic apparatus also optically coupled with said selected fluid flow-subjected local area portion of said coating layer and responsive to both fluid flow related coating layer color changes and coating layer illuminated-spot shape distortion changes induced by changes in said fluid flow.

2. The laser based thermal tuft fluid flow investigation apparatus of claim 1 wherein said substrate member comprises a life-sized model of a workpiece subjected to said fluid flow.

3. The laser based thermal tuft fluid flow investigation apparatus of claim 1 wherein said substrate member is selected from the group consisting of methyl acrylate plastic and polystyrene foam.

4. The laser based thermal tuft fluid flow investigation apparatus of claim 1 wherein said porous optically opaque coating layer received on said substrate member comprises black paint.

5. The laser based thermal tuft fluid flow investigation apparatus of claim 1 wherein said color-alterable thermally responsive coating layer received on said substrate member porous optically opaque coating layer in thermal communication with said fluid flow is selected from the group consisting of thermal liquid crystals and phosphor.

6. The laser based thermal tuft fluid flow investigation apparatus of claim 1 wherein said laser apparatus optically coupled with a selected fluid flow-subjected local area portion of said color alterable thermally responsive coating layer comprises an ADLAS diode pumped YAG laser.

7. A non-intrusive, heat transfer-based surface flow visualization method comprising the steps of:

coating an opaque substrate with phosphor;

heating said phosphor;

conducting and conveying said heat along said substrate by applying air flow thereto; and observing a directional flow pattern within said phosphor on said substrate.

8. A non-intrusive, laser based thermal tuft fluid flow investigation method comprising the steps of:

coating a shape-similar thermally insulating model of a workpiece having a first porous, optically opaque coating layer thereon with a second color-alterable thermally responsive coating layer;

laser-induced heating of a selected flow-subjected local area portion of said second color-alterable thermally responsive coating layer; and videotaping said selected flow-subjected local area portion of said second color-alterable thermally responsive coating layer, said videotaping responsive to both fluid flow related coating layer color changes and coating layer illuminated-spot shape distortion changes induced by changes in said fluid flow.

9. The non-intrusive, laser based thermal tuft fluid flow investigation method of claim 8 wherein said shape-similar thermally insulating model of a workpiece is selected from the group consisting of methyl acrylate plastic and polystyrene foam.

10. The non-intrusive, laser based thermal tuft fluid flow investigation method of claim 8 wherein said second color-alterable thermally responsive coating layer is selected from the group consisting of liquid crystals and phosphor.

11. The non-intrusive, laser based thermal tuft fluid flow investigation method of claim 8 wherein said shape-similar thermally insulating model of a workpiece has a thermal conductivity of less than 0.4 British Thermal Units.

12. The non-intrusive, laser based thermal tuft fluid flow investigation method of claim 8 wherein said coating layer illuminated-spot shape distortion change is a tear-drop pattern which points in the direction of flow.

* * * * *